US011663391B2

(12) United States Patent
Wolpert et al.

(10) Patent No.: US 11,663,391 B2
(45) Date of Patent: May 30, 2023

(54) LATCH-UP AVOIDANCE FOR SEA-OF-GATES

(71) Applicant: International Business Machines Corporation, Armonk, NY (US)

(72) Inventors: David Wolpert, Poughkeepsie, NY (US); Ryan Michael Kruse, Williamson, TX (US); Leon Sigal, Monsey, NY (US); Richard Edward Serton, Charlottesville, VA (US); Matthew Stephen Angyal, Stormville, NY (US); Terence Hook, Jericho Center, VT (US); Richard Andre Wachnik, Mount Kisco, NY (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 17/411,113

(22) Filed: Aug. 25, 2021

(65) Prior Publication Data

US 2023/0062945 A1 Mar. 2, 2023

(51) Int. Cl.
*G06F 30/394* (2020.01)
*H01L 27/02* (2006.01)

(52) U.S. Cl.
CPC ........ *G06F 30/394* (2020.01); *H01L 27/0207* (2013.01)

(58) Field of Classification Search
CPC .................. G06F 30/394; H01L 27/0207
See application file for complete search history.

(56) References Cited

U.S. PATENT DOCUMENTS

| | | | |
|---|---|---|---|
| 4,683,488 A | 7/1987 | Lee et al. | |
| 4,786,613 A | 11/1988 | Gould et al. | |
| 4,942,447 A | 7/1990 | Park et al. | |
| 5,367,187 A | 11/1994 | Yuen | |
| 6,433,983 B1 | 8/2002 | Fechner | |
| 6,812,519 B2 | 11/2004 | Furuhata | |
| 7,102,867 B2 | 9/2006 | Goldman | |
| 7,696,541 B2 | 4/2010 | Chapman et al. | |
| 10,509,878 B1 * | 12/2019 | Ding | G06F 1/10 |

(Continued)

FOREIGN PATENT DOCUMENTS

| | | |
|---|---|---|
| EP | 0614224 A1 | 9/1994 |
| JP | 63137450 A | 6/1988 |

(Continued)

*Primary Examiner* — Jack Chiang
*Assistant Examiner* — Aric Lin
(74) *Attorney, Agent, or Firm* — Cantor Colburn LLP; Kelsey M. Skodje

(57) ABSTRACT

Aspects of the invention include systems and methods for implementing a CMOS circuit design that uses a sea-of-gates fill methodology to provide latch-up avoidance. A non-limiting example computer-implemented method includes identifying a fill cell in the circuit design. The fill cell can include a power rail, a ground rail, and a field-effect transistor (FET) electrically coupled to the power rail through a via. The method can include disconnecting the via from the power rail and moving the via to a disconnected node in the fill cell. Moving the via decouples a source or drain of the fill cell from a well of the fill cell, preventing latch-up while maintaining via and metal shape density.

17 Claims, 9 Drawing Sheets

(56) References Cited

U.S. PATENT DOCUMENTS

| | | | | |
|---|---|---|---|---|
| 2004/0064801 A1* | 4/2004 | Venkatraman | ......... | G06F 30/39 |
| | | | | 700/121 |
| 2007/0207681 A1* | 9/2007 | Zabroda | ............ | G06V 40/1329 |
| | | | | 439/717 |
| 2009/0321791 A1* | 12/2009 | Wagner | ................ | G06F 30/394 |
| | | | | 257/E27.07 |
| 2017/0323032 A1* | 11/2017 | Datta | ................... | G06F 30/327 |

FOREIGN PATENT DOCUMENTS

| | | |
|---|---|---|
| JP | 02189951 A | 7/1990 |
| JP | 2005340461 A | 12/2005 |

\* cited by examiner

LATCH-UP AVOIDANCE FOR SEA-OF-GATES

BACKGROUND

The present invention generally relates to circuit design for complementary metal oxide semiconductor (CMOS) integrated circuit structures. More specifically, the present invention relates to a CMOS circuit design that uses a sea-of-gates fill methodology to provide latch-up avoidance.

Field effect transistors (FETs) are the transistor of choice for use in complex integrated digital circuits. In general, field effect transistors can be fabricated somewhat more simply and with larger process windows than bipolar transistors and, additionally, allow simplified circuit and device design. Constraints on transistor footprint size and current-carrying capacity are continually increasing to satisfy demands for higher digital switching performance, increased functionality, and economy of manufacture. CMOS technology is currently the dominant FET-based platform for the manufacture of inverters and other logic gates used in digital integrated circuits, including microprocessors, microcontrollers, or static random-access memory (SRAM). The word "complementary" refers to the fact that a typical CMOS circuit uses complementary pairs of hole-type (positive) and electron-type (negative) FETs, i.e., p-FETs and n-FETs, respectively.

Monolithic CMOS integrated circuits include a plurality of N-channel and P-channel metal-oxide-semiconductor field-effect transistors (MOSFETs), typically formed in a common silicon substrate. The major advantages of CMOS technology include low power dissipation, high noise immunity, a large supply voltage tolerance, symmetrical switching characteristics, and ease of circuit design. Despite these advantages, CMOS technology is complex and expensive and was not generally utilized until recently for very-large-scale-integration (VLSI) designs. However, with the continuous reduction in device (e.g. transistor) size and the advent of the VLSI era, CMOS technology has become a significant choice for VLSI designs, where perhaps the most important advantage of CMOS technology is low power consumption, since heat generation becomes a more significant factor as device density increases.

SUMMARY

Embodiments of the present invention are directed to circuit designs that use a sea-of-gates fill methodology to provide latch-up avoidance. A non-limiting example method includes identifying a fill cell in the circuit design. The fill cell can include a power rail, a ground rail, and a field-effect transistor (FET) electrically coupled to the power rail through a via. The method can include disconnecting the via from the power rail and moving the via to a disconnected node in the fill cell. Moving the via decouples a source or drain of the fill cell from a well of the fill cell, preventing latch-up.

Other embodiments of the present invention implement features of the above-described method in computer systems and computer program products.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

Figure 1:
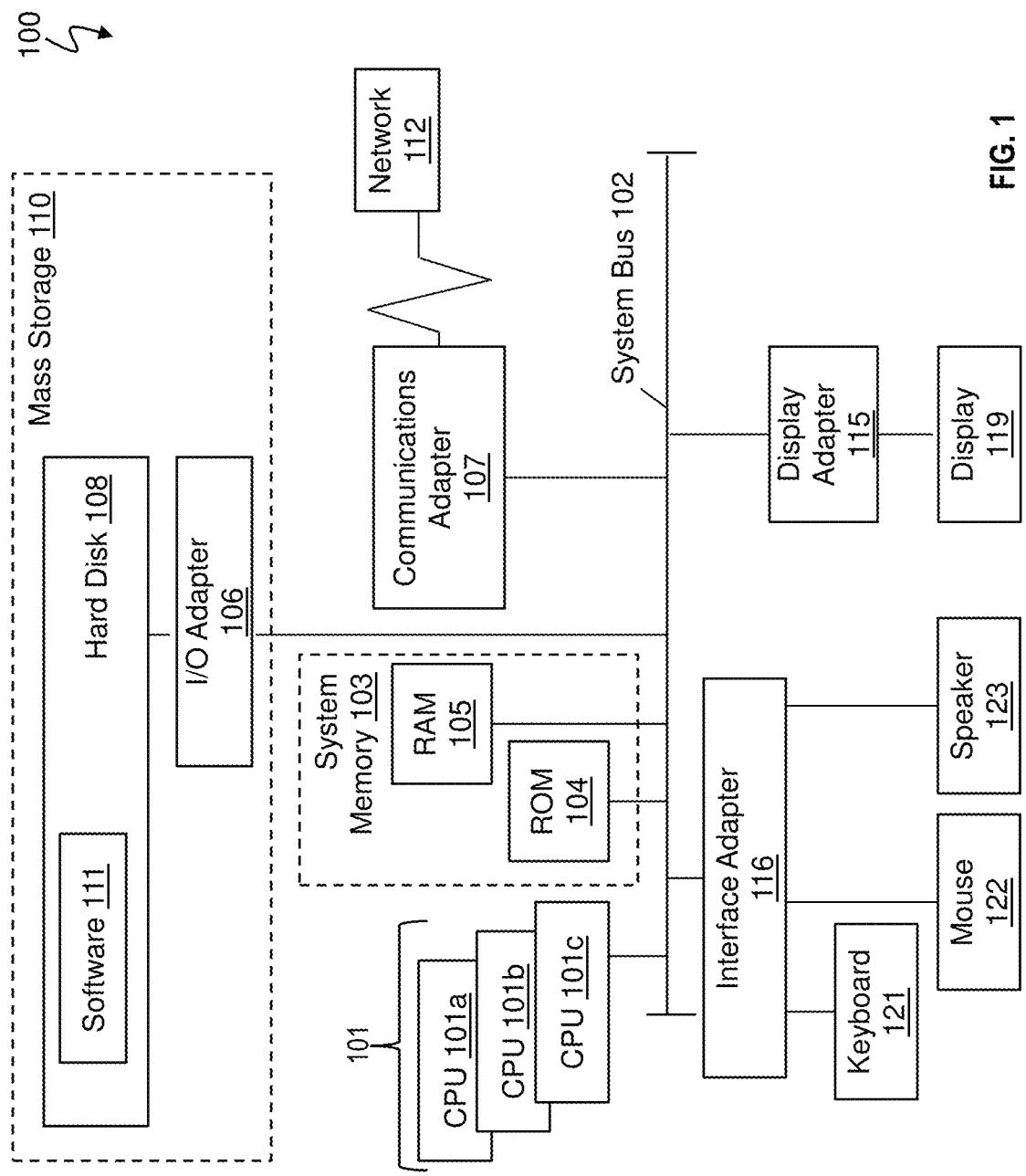
FIG. 1 depicts a block diagram of an example computer system for use in conjunction with one or more embodiments of the present invention.

For the sake of brevity, conventional techniques related to semiconductor device and integrated circuit (IC) fabrication may or may not be described in detail herein. Moreover, the various tasks and process steps described herein can be incorporated into a more comprehensive procedure or process having additional steps or functionality not described in detail herein. In particular, various steps in the manufacture of semiconductor devices and semiconductor-based ICs are well known and so, in the interest of brevity, many conventional steps will only be mentioned briefly herein or will be omitted entirely without providing the well-known process details.

Turning now to an overview of technologies that are more specifically relevant to aspects of the present invention, IC feature geometries are continually being driven to smaller and smaller dimensions. As packing density increases in CMOS integrated circuits, a well-known phenomenon known as latch-up is more likely to occur. As the design of CMOS integrated circuits continues to scale, the proximity of the PN junctions that form the NMOS and PMOS transistors shrinks, creating inherent parasitic transistors and diodes. These parasitic structures create PNPN Thyristors, also called silicon-controlled rectifiers (SCRs).

Latch-up occurs when a pair of parasitic bipolar transistors formed by adjacent N-channel and P-channel devices become uncontrollably conductive. Effectively, the SCR is formed by the parasitic transistors. This can happen, for example, when an excessively large input signal (input voltage) is applied to an amplifier, as active devices (e.g., transistors) can be driven into saturation or cut-off conditions. Under saturation conditions, local feedback loops may be set up due to parasitic transistors that are inadvertently established between p and n-type regions of an active device and the substrate. This local positive feedback results in what is known as latch-up.

In some scenarios large input voltages are inadvertent or otherwise unavoidable (e.g., static shock, etc.). In the event that a large input signal is applied to an active device simultaneously with the delivery of a power supply current, latch-up may occur. In general, recovery from latch-up is only possible by manually turning off or unplugging the power supply for a short period of time.

Conventionally, layout or process modifications have been proposed to decrease the probability of any of these mechanisms leading to a catastrophic latch-up of bulk CMOS circuits. However, these layout and process modifications involve either increased process complexity or decreased circuit density. For example, one technique for avoiding latch-up includes the use of guard rings, which are heavily doped areas around each device. Guard rings both increase process complexity and take up valuable chip area, reducing packing density. Another type of latch-up prevention structure includes the use of buffer regions between complementary transistors. These buffer regions are of a type opposite the type of the substrate material (i.e., N vs. P, or P vs. N). A buffer region can include a heavily doped channel portion near the surface and a lightly doped channel portion which extends downwardly from the heavily doped channel portion. These types of configurations represent an area penalty that directly limits device packing density. The fabrication process can also be somewhat complex. Another approach to reduce (not eliminate) latch-up is the introduction of deep, narrow grooves that physically isolate each transistor. The trade-off, unfortunately, is the introduction of structural instabilities and sidewall leakage that limits utilization design flexibility.

One or more embodiments of the present invention address one or more of the above-described shortcomings by providing a CMOS circuit design that uses a sea-of-gates fill methodology to provide latch-up avoidance. Embodiments of the present invention provide a mechanism to prevent latch-up by designing the circuit in a manner that breaks the N-well-to-P+ component of the latch-up feedback loop. In some embodiments of the invention, the metal connectivity in "fill cells" within the circuit design is altered by removing one or more via connections from the supply rail and moving those vias to disconnected nodes, breaking the latch-up cycle. As used herein, a "fill cell" refers to the spare cells in a circuit design that do not provide logic in the final device, but are included to provide redundancy, pattern continuity, and to meet density requirements. Fill cells include, for example, engineering change order (ECO) cells, ECO decoupling capacitor cells, and fill-buffer cells. Without wishing to be bound by theory, these types of cells have been found to be particularly susceptible to latch-up.

In some embodiments of the invention, moving a via connection from the supply rail to a disconnected node is not sufficient to completely prevent latch-up, as cells placed in the circuit row above (e.g., in an adjacent location on the chip floorplan) might include vias that would effectively reconnect the problematic condition. To address this, fill cells can be redesigned to prohibit this condition more broadly, by removing the via and pulling back the local interconnect between the power supply rail and the device diffusion region so that there is no contact path to the supply rail through multiple process layers.

Advantageously, leveraging a sea-of-gates fill methodology according to one or more embodiments to provide latch-up avoidance offers several technical solutions over conventional anti latch-up schemes. As an initial matter, the metal connectivity in fill cells can be modified without introducing an area penalty in the circuit design. Moreover, implementation is somewhat straightforward, as fill cell changes do not impact on the logic/active regions of the circuit. In particular, leveraging a sea-of-gates fill methodology according to one or more embodiments enables latch-up suppression without the use of large guard regions, trenches, or other steps that cause added process complexity and/or area penalties and without the need for implementing latch-up suppression circuits.

Turning now to FIG. 1, a computer system 100 is generally shown in accordance with one or more embodiments of the invention. The computer system 100 can be an electronic, computer framework comprising and/or employing any number and combination of computing devices and networks utilizing various communication technologies, as described herein. The computer system 100 can be scalable, extensible, and modular, with the ability to change to different services or reconfigure some features independently of others. The computer system 100 may be, for example, a server, desktop computer, laptop computer, tablet computer, or smartphone. In some examples, computer system 100 may be a cloud computing node (e.g., a node 10 of FIG. 8 below). Computer system 100 may be described in the general context of computer system executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer system 100 has one or more central processing units (CPU(s)) 101a, 101b, 101c, etc., (collectively or generically referred to as processor(s) 101). The processors 101 can be a single-core processor, multi-core processor, computing cluster, or any number of other configurations. The processors 101, also referred to as processing circuits, are coupled via a system bus 102 to a system memory 103 and various other components. The system memory 103 can include a read only memory (ROM) 104 and a random access memory (RAM) 105. The ROM 104 is coupled to the system bus 102 and may include a basic input/output system (BIOS) or its successors like Unified Extensible Firmware Interface (UEFI), which controls certain basic functions of the computer system 100. The RAM is read-write memory coupled to the system bus 102 for use by the processors 101. The system memory 103 provides temporary memory space for operations of said instructions during operation. The system memory 103 can include random access memory (RAM), read only memory, flash memory, or any other suitable memory systems.

The computer system 100 comprises an input/output (I/O) adapter 106 and a communications adapter 107 coupled to the system bus 102. The I/O adapter 106 may be a small computer system interface (SCSI) adapter that communicates with a hard disk 108 and/or any other similar component. The I/O adapter 106 and the hard disk 108 are collectively referred to herein as a mass storage 110.

Software 111 for execution on the computer system 100 may be stored in the mass storage 110. The mass storage 110 is an example of a tangible storage medium readable by the processors 101, where the software 111 is stored as instructions for execution by the processors 101 to cause the computer system 100 to operate, such as is described herein below with respect to the various Figures. Examples of computer program product and the execution of such instruction is discussed herein in more detail. The communications adapter 107 interconnects the system bus 102 with a network 112, which may be an outside network, enabling the computer system 100 to communicate with other such systems. In one embodiment, a portion of the system memory 103 and the mass storage 110 collectively store an operating system, which may be any appropriate operating system to coordinate the functions of the various components shown in FIG. 1.

Additional input/output devices are shown as connected to the system bus 102 via a display adapter 115 and an interface adapter 116. In one embodiment, the adapters 106, 107, 115, and 116 may be connected to one or more I/O buses that are connected to the system bus 102 via an intermediate bus bridge (not shown). A display 119 (e.g., a screen or a display monitor) is connected to the system bus 102 by the display adapter 115, which may include a graphics controller to improve the performance of graphics intensive applications and a video controller. A keyboard 121, a mouse 122, a speaker 123, etc., can be interconnected to the system bus 102 via the interface adapter 116, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI) and the Peripheral Component Interconnect Express (PCIe). Thus, as configured in FIG. 1, the computer system 100 includes processing capability in the form of the processors 101, and, storage capability including the system memory 103 and the mass storage 110, input means such as the keyboard 121 and the mouse 122, and output capability including the speaker 123 and the display 119.

In some embodiments, the communications adapter 107 can transmit data using any suitable interface or protocol, such as the internet small computer system interface, among others. The network 112 may be a cellular network, a radio network, a wide area network (WAN), a local area network (LAN), or the Internet, among others. An external computing device may connect to the computer system 100 through the network 112. In some examples, an external computing device may be an external webserver or a cloud computing node.

It is to be understood that the block diagram of FIG. 1 is not intended to indicate that the computer system 100 is to include all of the components shown in FIG. 1. Rather, the computer system 100 can include any appropriate fewer or additional components not illustrated in FIG. 1 (e.g., additional memory components, embedded controllers, modules, additional network interfaces, etc.). Further, the embodiments described herein with respect to computer system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
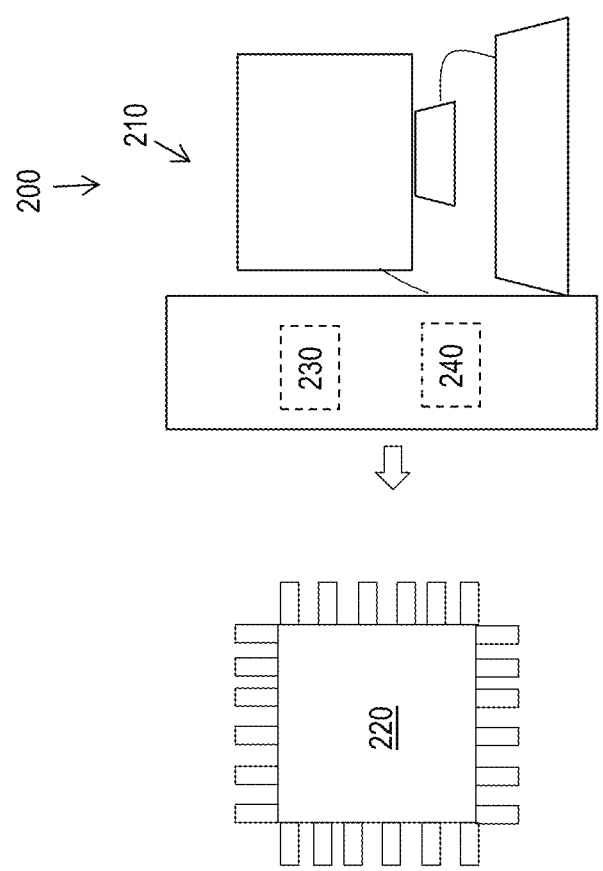
FIG. 2 is a block diagram of a system that provides a CMOS circuit design that uses a sea-of-gates fill methodology to provide latch-up avoidance in accordance with one or more embodiments of the present invention.

FIG. 2 is a block diagram of a system 200 configured to provide a CMOS circuit design that uses a sea-of-gates fill methodology to provide latch-up avoidance according to embodiments of the invention. The system 200 includes processing circuitry 210 used to generate the design that is ultimately fabricated into an integrated circuit 220. The steps involved in the fabrication of the integrated circuit 220 are well-known and briefly described herein. Once the physical layout is finalized, based, in part, on a sea-of-gates fill methodology that provides latch-up avoidance, to facilitate optimization of the routing plan, the finalized physical layout is provided to a foundry. Masks are generated for each layer of the integrated circuit based on the finalized physical layout. Then, the wafer is processed in the sequence of the mask order. The processing includes photolithography and etch. This is further discussed with reference to FIG. 3.

Figure 3:
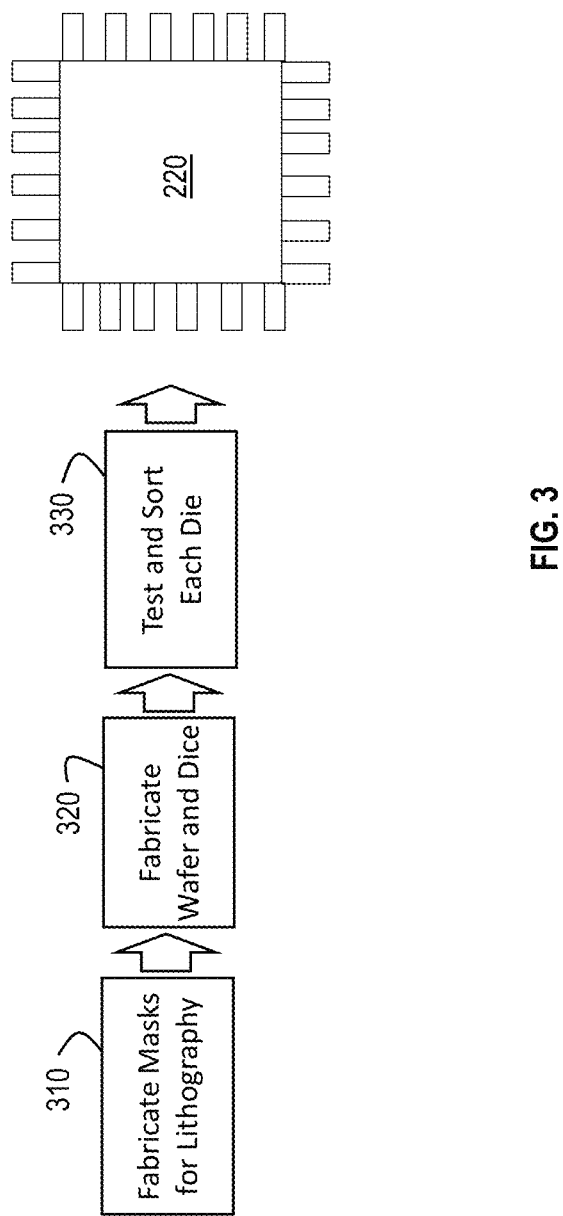
FIG. 3 is a process flow of a method of fabricating an integrated circuit in accordance with one or more embodiments of the present invention.

FIG. 3 is a process flow of a method of fabricating an integrated circuit (e.g., the IC 220 of FIG. 2) according to exemplary embodiments of the invention. Once the physical design data is obtained, based, in part, on a sea-of-gates fill methodology that provides latch-up avoidance, the integrated circuit 220 can be fabricated according to known processes that are generally described with reference to FIG. 3. Generally, a wafer with multiple copies of the final design is fabricated and cut (i.e., diced) such that each die is one copy of the integrated circuit 220. At block 310, the processes include fabricating masks for lithography based on the finalized physical layout. At block 320, fabricating the wafer includes using the masks to perform photolithography and etching. Once the wafer is diced, testing and sorting of each die is performed, at block 330, to filter out any faulty die.

Figure 4:
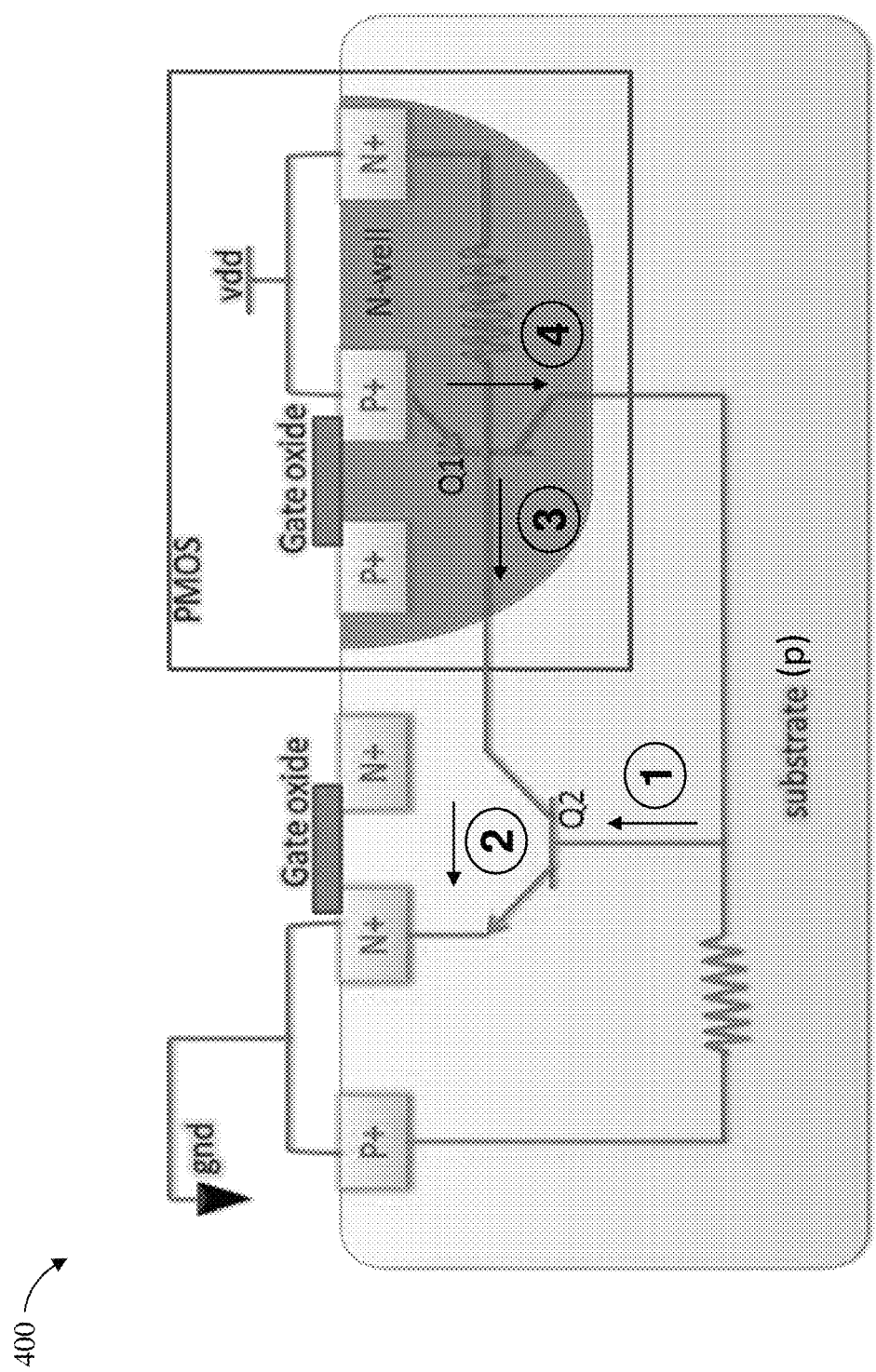
FIG. 4 illustrates a cross-sectional view of a CMOS circuit undergoing latch-up.

FIG. 4 illustrates a cross-sectional view of a CMOS circuit 400 in an N-well, P-substrate configuration undergoing latch-up. As shown in FIG. 4, the PMOS forms a parasitic vertical PNP from the P+ source/drain of the transistor (P+ diffusion region, also referred to as an emitter), the N-well (base) and the substrate (collector) (labeled node "4" in the latch-up cycle). A lateral NPN is formed from the N+ source/drain (N+ diffusion region, or emitter), P-type substrate (base), and the N-well (collector) (also referred to as the N-well to N+ current, labeled node "2"). The resultant circuit describes a PNPN.

As shown, a current impulse strikes the PMOS drain, and the P+/N-well junction (Q1) becomes forward biased, injecting current through the N-well into the substrate (labeled node "3"). If the impulse is high enough (sustainable for a sufficient length of time), the carriers injected into the substrate cause a voltage drop across the substrate resistance. This voltage drop results in a bias across the P−/N+ interface (i.e., substrate to NMOS drain) (labeled node "1") that can be high enough to turn on Q2. In this scenario, the Q2 collector current will then turn Q1 on more strongly. At that time, latch-up becomes self-sustaining, as a positive feedback loop has been formed. The result is a thermal runaway which, if not stopped, can result in permanent damage (e.g., melting) of the CMOS circuit 400. Once started, only cessation of the power supply can stop the latch-up condition.

Embodiments of the present invention break this latch-up cycle in fill cells by electrically decoupling the P+ source/drain of the transistor (emitter) from the N-well (base), breaking the latch-up cycle by removing node "4" from the feedback loop. The P+ source/drain of the transistor (emitter) can be decoupled by moving the P+ via connection from the supply rail (shown as "vdd") to a disconnected node (see FIG. 5 for an example implementation of this technique).

Figure 5:
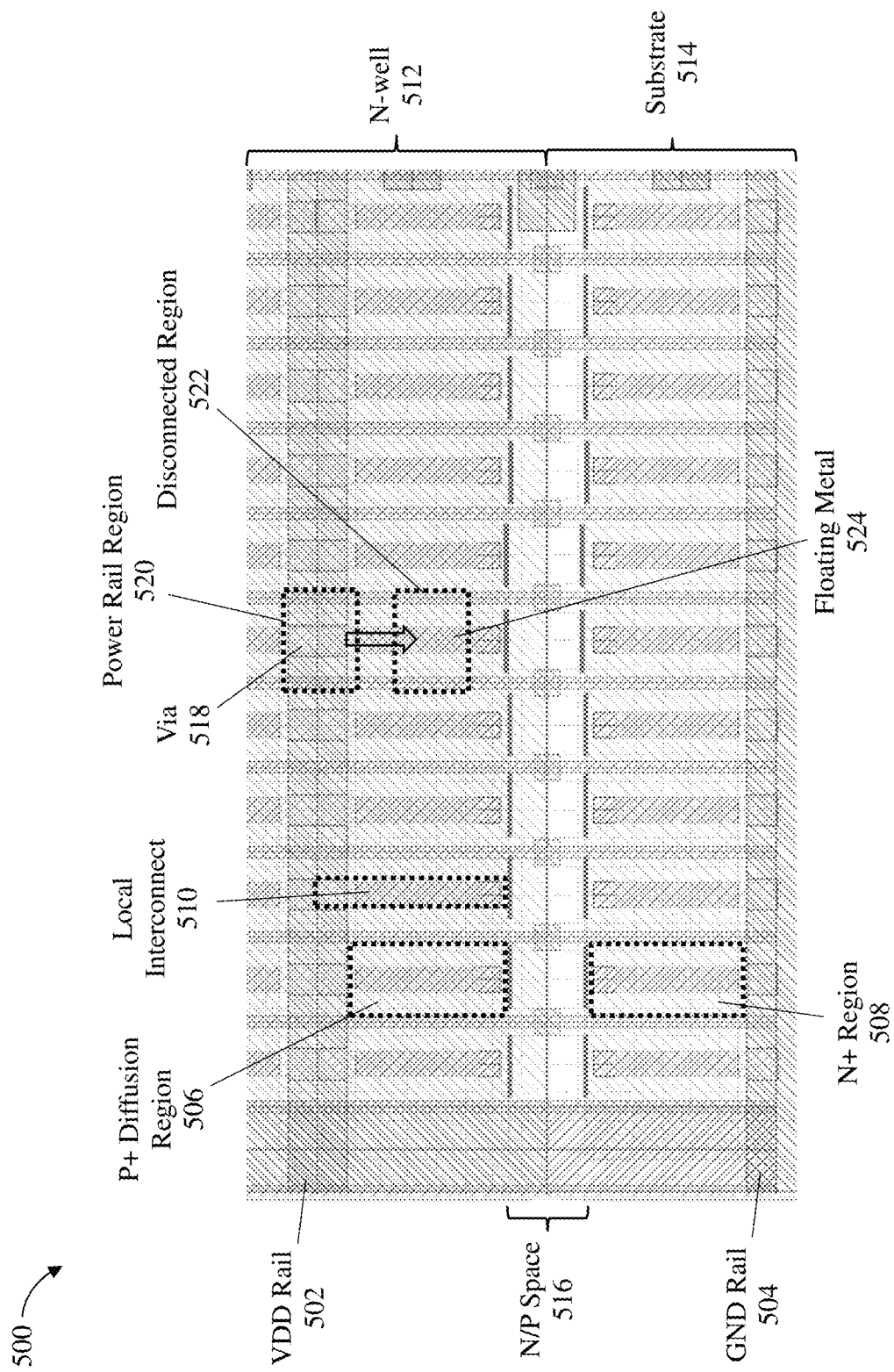
FIG. 5 illustrates a circuit design that uses a sea-of-gates fill methodology to provide latch-up avoidance in accordance with one or more embodiments of the present invention.

FIG. 5 illustrates a top-down circuit design 500 that uses a sea-of-gates fill methodology to provide latch-up avoidance in accordance with one or more embodiments of the present invention. As shown in FIG. 5, the circuit design 500 can include a power rail (e.g., VDD rail 502, also known as a supply rail) and a ground rail (e.g., GND rail 504). In some embodiments of the invention, the circuit design 500 is a CMOS circuit design formed from two or more transistors (not separately labeled) and includes a plurality of components (e.g., P+ diffusion region 506, N+ region 508, local interconnect 510, N-well 512, substrate 514, etc.). In some embodiments of the invention, the N-well 512 and the substrate 514 are separated by an N/P Space 516. In some embodiments of the invention, the N-well 512 sits on a portion of the substrate 514, as more clearly depicted in the cross-sectional view of FIG. 4. As shown, the N/P Space 516 is a 2-fin gap, although other configurations are within the contemplated scope of the disclosure. For example, the N/P Space 516 can include 1-fin, 2-fin, 3-fin, 4-fin, 5-fin, 6-fin, any other n-fin gap, or even no fins between PFET and NFET depending on the technology specification.

In some embodiments of the invention, latch-up is avoided by disconnecting one or more vias 518 from the VDD rail 502 in a power rail region 520 and moving the vias 518 to a disconnected region 522 where it is instead tied to a floating metal shape 524 to ensure proper via formation and via/metal density. In some embodiments of the invention, the floating metal shape 524 is not electrically coupled to the VDD rail 502. Consequently, the P+ source/drain of the respective device (e.g., P+ diffusion region 506) is decoupled from the N-well 512, breaking the latch-up cycle (see FIG. 4).

Figure 6:
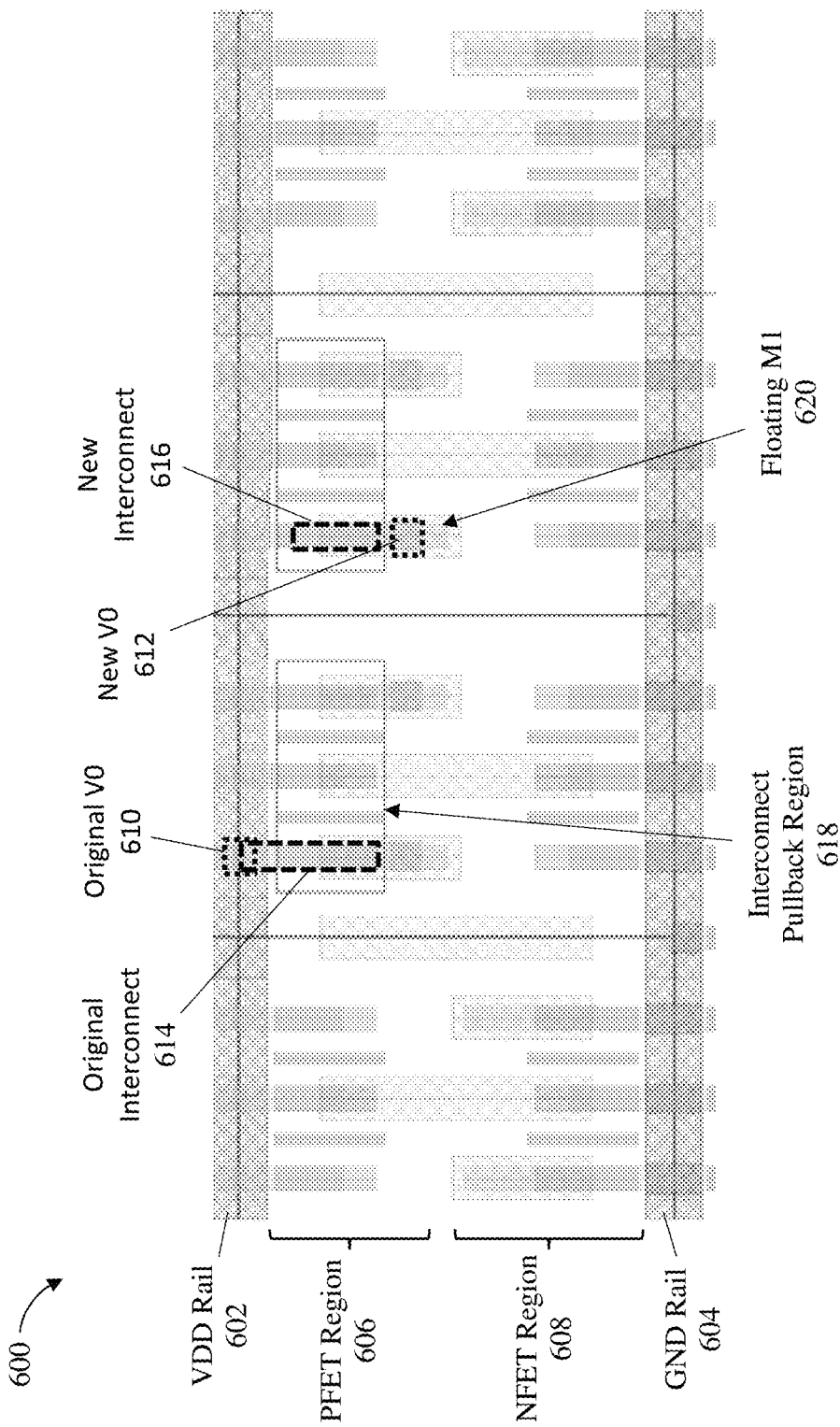
FIG. 6 illustrates a circuit design that uses an alternative sea-of-gates fill methodology to provide latch-up avoidance in accordance with one or more embodiments of the present invention.

FIG. 6 illustrates a circuit design 600 that uses an alternative sea-of-gates fill methodology to provide latch-up avoidance in accordance with one or more embodiments of the present invention. As discussed previously, moving a via connection from the supply rail to a disconnected node (as shown in FIG. 5) may not be sufficient to completely prevent latch-up, as cells placed in the circuit row above or below (e.g., in an adjacent location on the chip floorplan) might include vias that would effectively reconnect the problematic condition. In other words, in some embodiments of the invention, vias in adjacent cells can electrically couple the newly moved via back to the power rail. To address this, in some embodiments of the invention, fill cells can be redesigned to prohibit this condition more broadly by removing the via and pulling back the local interconnect between the supply rail and the PFET contact so that there is no contact path to the supply rail, even through multiple process layers (e.g., the layers above/below).

The circuit design 600 can include a VDD rail 602, a GND rail 604, a PFET Region 606, and an NFET Region 608, configured and positioned as shown. In some embodiments of the invention, one or more vias (e.g., original V0 610) are removed from the VDD rail 602 and repositioned (e.g., new V0 612) in a similar manner as discussed previously with respect to the circuit design 500 (FIG. 5). As further shown in FIG. 6, in some embodiments of the invention, the local interconnect (e.g., original interconnect 614) is pulled back to a new location (e.g., new interconnect 616) in an interconnect pullback region 618) so that there is no overlap with the VDD Rail 602. In effect, this creates a floating metal layer (e.g., floating M1 620) that is isolated from the circuit rows above/below (not separately shown).

In this manner, cells placed in the circuit row above (or below) cannot electrically couple the disconnected via (e.g., new V0 612) back to the VDD rail 602. While shown as two separate interconnect pullback regions for ease of illustration, it is understood that these regions can represent before and after views of the same region shown separately to better depict the repositioning of the new via and new interconnect.

Figure 7:
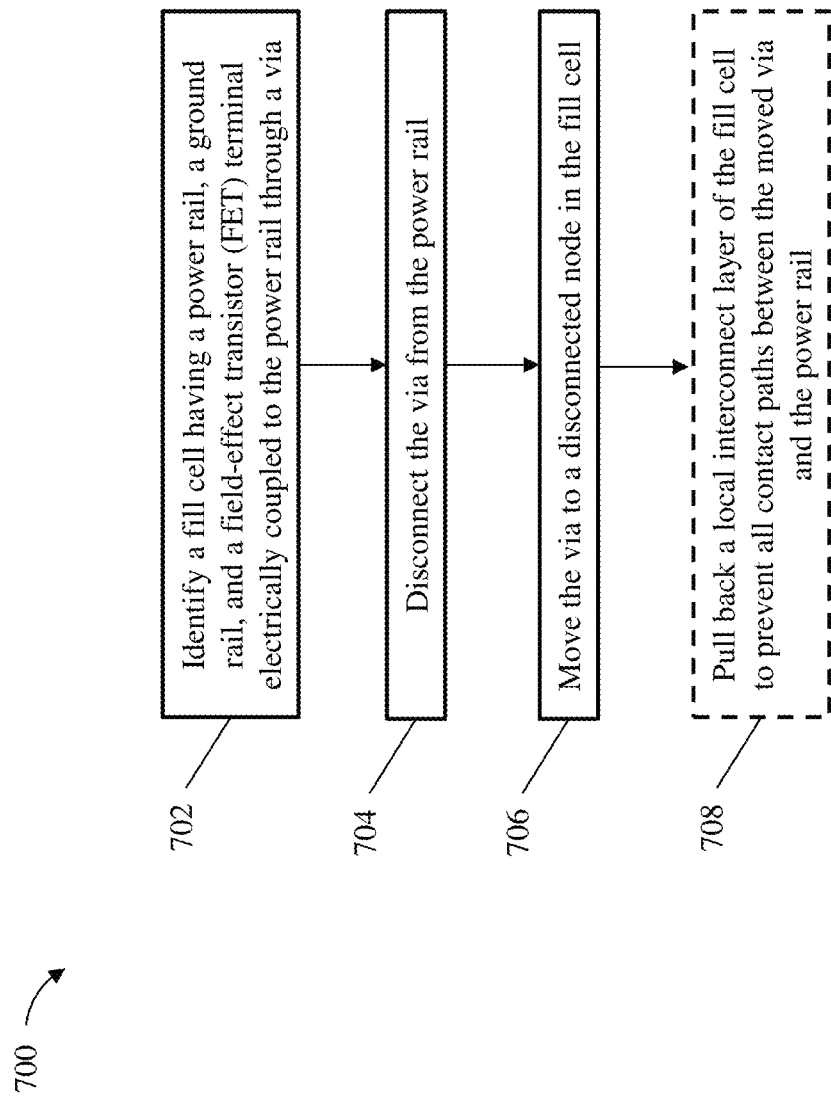
FIG. 7 is a flowchart in accordance with one or more embodiments of the present invention.

Referring now to FIG. 7, a flowchart 700 for providing a CMOS circuit design that uses a sea-of-gates fill methodology to provide latch-up avoidance is generally shown according to an embodiment. The flowchart 700 is described in reference to FIGS. 1-6 and may include additional blocks not depicted in FIG. 7. Although depicted in a particular order, the blocks depicted in FIG. 7 can be rearranged, subdivided, and/or combined.

At block 702, a fill cell is identified in the circuit design. In some embodiments of the invention, the fill cell includes a power rail, a ground rail, and an FET terminal electrically coupled to the power rail through a via. In some embodiments of the invention, the fill cell includes an ECO cell or an ECO decoupling capacitor cell. In some embodiments of the invention, the fill cell includes a two-fin wide N/P spacing. In some embodiments of the invention, the fill cell includes a 0-fin, 1-fin, 3-fin, 4-fin, 5-fin, or 6-fin wide N/P spacing.

At block 704, the via is disconnected from the power rail. At block 706, the via is moved to a disconnected node in the fill cell. Moving the via in this manner decouples a source or drain of the fill cell from a well of the fill cell, thereby preventing latch-up. In some embodiments of the invention, moving the via to a disconnected node includes placing the via on a surface of a floating metal within the fill cell. In some embodiments of the invention, the source or drain includes a p-type doped source or drain. In some embodiments of the invention, the well includes an n-type well.

At optional block 708, a local interconnect layer of the fill cell is pulled back to prevent all contact paths between the moved via and the power rail. In this manner, inadvertent reconnections between the moved via and the power rail (e.g., planar connection or connections from metal layers above/below) are blocked.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
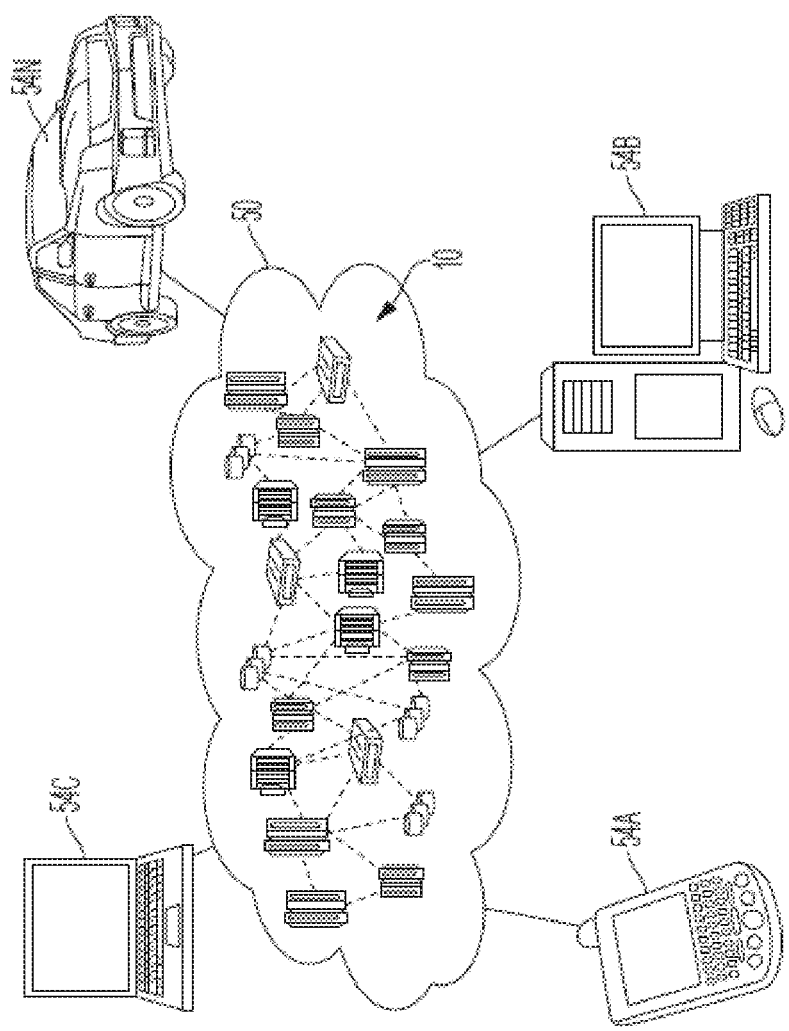
FIG. 8 depicts a cloud computing environment according to one or more embodiments of the present invention.

Referring now to FIG. 8, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described herein above, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
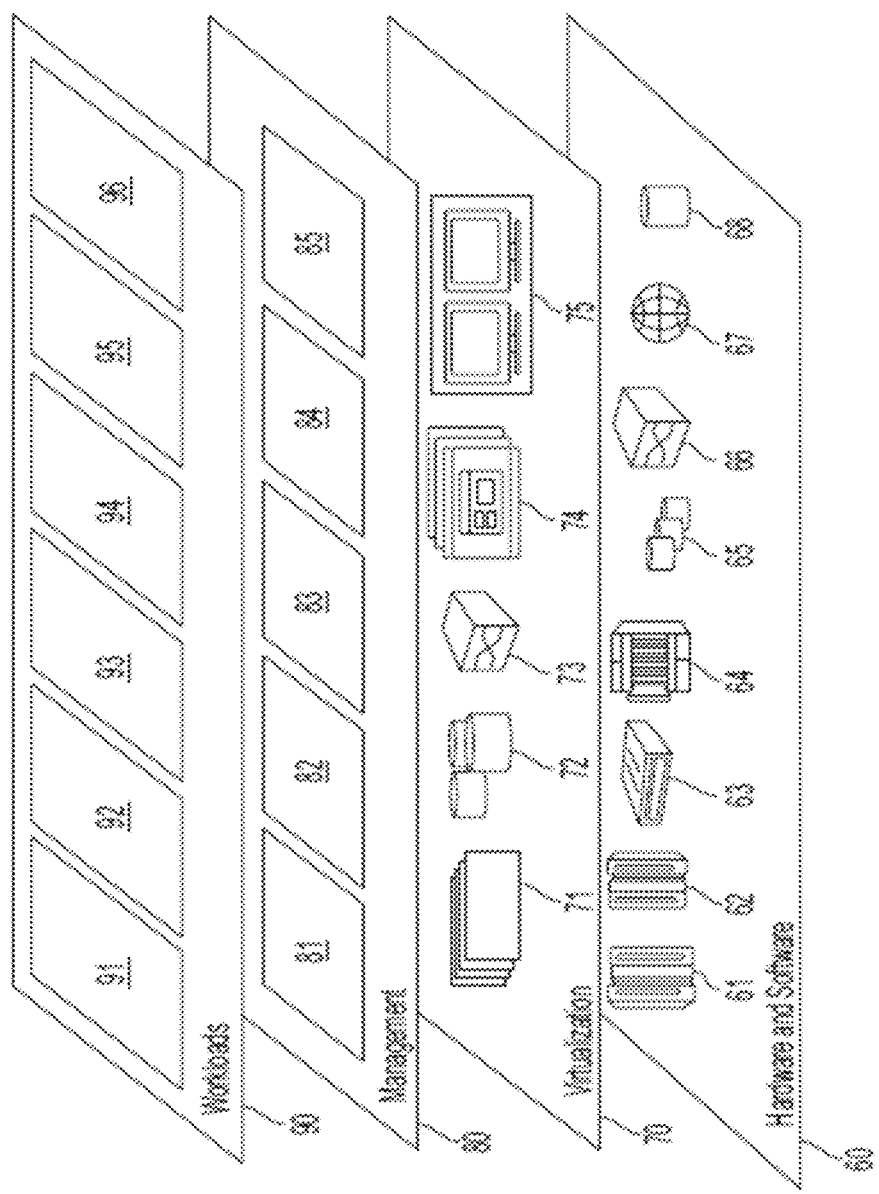
FIG. 9 depicts abstraction model layers according to one or more embodiments of the present invention.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and software applications 96 (e.g., software applications 206 of FIG. 2), etc. Also, software applications can function with and/or be integrated with Resource provisioning 81.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for preventing latch-up in a complementary metal oxide semiconductor (CMOS) circuit, the method comprising:
    identifying a fill cell comprising a power rail, a ground rail, and a field-effect transistor (FET) terminal electrically coupled to the power rail through a via;
    disconnecting the via from the power rail;

moving the via to a floating metal of a disconnected node in the fill cell, whereby moving the via decouples a source or drain of the fill cell from a well of the fill cell, wherein the floating metal remains floating after moving the via to prevent latch-up; and fabricating the CMOS circuit using a physical layout comprising the moved via and the decoupled source or drain of the fill cell.

2. The computer-implemented method of claim 1 further comprising pulling back a local interconnect layer of the fill cell to prevent all contact paths between the moved via and the power rail.

3. The computer-implemented method of claim 1, wherein the source or drain comprises a p-type doped source or drain.

4. The computer-implemented method of claim 3, wherein the well comprises an n-type well.

5. The computer-implemented method of claim 1, wherein the fill cell comprises an engineering change order (ECO) cell or an ECO decoupling capacitor cell.

6. The computer-implemented method of claim 1, wherein the fill cell comprises a two-fin wide N/P spacing.

7. A system comprising a memory having computer readable instructions and one or more processors for executing the computer readable instructions, the computer readable instructions controlling the one or more processors to perform operations comprising:

identifying a fill cell comprising a power rail, a ground rail, and a field-effect transistor (FET) terminal electrically coupled to the power rail through a via;

disconnecting the via from the power rail;

moving the via to a floating metal of a disconnected node in the fill cell, whereby moving the via decouples a source or drain of the fill cell from a well of the fill cell, wherein the floating metal remains floating after moving the via to prevent latch-up; and causing a complementary metal oxide semiconductor (CMOS) circuit to be fabricated using a physical layout comprising the moved via and the decoupled source or drain of the fill cell.

8. The system of claim 7 further comprising pulling back a local interconnect layer of the fill cell to prevent all contact paths between the moved via and the power rail.

9. The system of claim 7, wherein the source or drain comprises a p-type doped source or drain.

10. The system of claim 9, wherein the well comprises an n-type well.

11. The system of claim 7, wherein the fill cell comprises an engineering change order (ECO) cell or an ECO decoupling capacitor cell.

12. The system of claim 7, wherein the fill cell comprises a two-fin wide N/P spacing.

13. A computer program product comprising a computer readable storage medium having program instructions embodied therewith, the program instructions executable by one or more processors to cause the one or more processors to perform operations comprising:

identifying a fill cell comprising a power rail, a ground rail, and a field-effect transistor (FET) terminal electrically coupled to the power rail through a via;

disconnecting the via from the power rail;

moving the via to a floating metal of a disconnected node in the fill cell, whereby moving the via decouples a source or drain of the fill cell from a well of the fill cell, wherein the floating metal remains floating after moving the via to prevent latch-up; and causing a complementary metal oxide semiconductor (CMOS) circuit to be fabricated using a physical layout comprising the moved via and the decoupled source or drain of the fill cell.

14. The computer program product of claim 13 further comprising pulling back a local interconnect layer of the fill cell to prevent all contact paths between the moved via and the power rail.

15. The computer program product of claim 13, wherein the source or drain comprises a p-type doped source or drain.

16. The computer program product of claim 15, wherein the well comprises an n-type well.

17. The computer program product of claim 13, wherein the fill cell comprises an engineering change order (ECO) cell or an ECO decoupling capacitor cell.

* * * * *